United States Patent
Wu et al.

(10) Patent No.: US 12,547,766 B2
(45) Date of Patent: Feb. 10, 2026

(54) METHODS, SYSTEMS, AND APPARATUSES FOR TRAINING PRIVACY PRESERVING MODEL

(71) Applicant: Alipay (Hangzhou) Information Technology Co., Ltd., Zhejiang (CN)

(72) Inventors: Huiwen Wu, Hangzhou (CN); Cen Chen, Hangzhou (CN); Li Wang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 143 days.

(21) Appl. No.: 18/491,496

(22) Filed: Oct. 20, 2023

(65) Prior Publication Data
US 2024/0045993 A1    Feb. 8, 2024

Related U.S. Application Data

(63) Continuation of application No. PCT/CN2022/086538, filed on Apr. 13, 2022.

(30) Foreign Application Priority Data

Apr. 21, 2021   (CN) .......................... 202110433119.8

(51) Int. Cl.
*G06F 21/62*       (2013.01)
(52) U.S. Cl.
CPC ................ *G06F 21/6245* (2013.01)
(58) Field of Classification Search
CPC ............. G06F 21/6245; G06F 18/213; G06F 18/2132; G06F 18/2134; G06F 18/2135;
(Continued)

(56) References Cited

U.S. PATENT DOCUMENTS 11,501,152 B2 * 11/2022 Yehezkel Rohekar ...................... G06N 3/0495
2019/0138934 A1 * 5/2019 Prakash ................... H04L 43/20
(Continued)

FOREIGN PATENT DOCUMENTS

| CN | 110399742 A | 11/2019 |
| CN | 110990871 A | 4/2020 |

(Continued)

OTHER PUBLICATIONS

International Preliminary Report on Patentability in Appln. No. PCT/CN2022/086538, mailed on Nov. 2, 2023, 12 pages.
(Continued)

*Primary Examiner* — Mohammed Waliullah
(74) *Attorney, Agent, or Firm* — Fish & Richardson P.C.

(57) ABSTRACT

Privacy preservation model training includes a plurality of iterative update rounds performed on a model held by a data party of a plurality of data parties participating in training to obtain model data, which includes first shared data and local data corresponding to a shared portion and a dedicated portion of the model, respectively. The iterative training adds a perturbation to the first shared data to perform privacy preservation on at least the first shared data. The first shared data is transmitted to a server, which determines, based on first shared data of the plurality of data parties, second shared data. The shared portion of the model is updated based on the second shared data returned by the server. A next iterative update round is performed based on an updated model or using the updated model as a final model.

20 Claims, 6 Drawing Sheets

(58) Field of Classification Search
CPC .... G06F 18/2136; G06N 3/045; G06N 3/084; G06N 20/00
See application file for complete search history.

(56) References Cited

U.S. PATENT DOCUMENTS

| | | | |
|---|---|---|---|
| 2019/0318268 A1 | 10/2019 | Wang et al. | |
| 2020/0272945 A1 | 8/2020 | Manamohan et al. | |
| 2021/0049298 A1 | 2/2021 | Suresh et al. | |
| 2021/0073677 A1* | 3/2021 | Peterson | G06N 3/09 |
| 2021/0097691 A1* | 4/2021 | Liu | G06T 11/60 |
| 2023/0068386 A1* | 3/2023 | Akdeniz | G06N 3/084 |

FOREIGN PATENT DOCUMENTS

| | | | |
|---|---|---|---|
| CN | 111915023 | 11/2020 | |
| CN | 111931950 | 11/2020 | |
| CN | 112118099 A | 12/2020 | |
| CN | 112348199 | 2/2021 | |
| CN | 112668726 | 4/2021 | |
| CN | 113032835 | 6/2021 | |
| WO | 2018174873 A1 | 9/2018 | |
| WO | WO-2021158313 A1 * | 8/2021 | ............ G06N 20/00 |
| WO | WO-2022223629 A1 * | 10/2022 | |

OTHER PUBLICATIONS

International Search Report and Written Opinion in Appln. No. PCT/CN2022/086538, mailed on Jul. 11, 2022, 17 pages (with English translation).

Li et al., "Data Differential Privacy Protection Stochastic Gradient Descent Algorithm for Deep Neural Network Training," Computer Applications and Software, Apr. 2020, 37(4):252-259 (with English abstract).

Mi et al., "Differential Privacy Protection Method for Deep Learning," Ship Electronic Engineering, Sep. 2020, 40 (9), 4 pages (with English abstract).

* cited by examiner

METHODS, SYSTEMS, AND APPARATUSES FOR TRAINING PRIVACY PRESERVING MODEL

CROSS-REFERENCE TO RELATED APPLICATIONS

This application is a continuation of PCT Application No. PCT/CN2022/086538 filed on Apr. 13, 2022, which claims priority to Chinese Patent Application No. CN202110433119.8, filed on Apr. 21, 2021, and each application is hereby incorporated by reference in its entirety.

TECHNICAL FIELD

This specification relates to the field of machine learning, and in particular, to methods, systems, and apparatuses for training a privacy preserving model.

BACKGROUND

In recent years, machine learning models have been widely used to analyze and discover potential data values in the fields of data analysis, data mining, and economic prediction. Because data held by a single data owner are possibly incomplete, it is difficult for a machine learning model obtained through training based on the data of the single data owner to accurately describe a target. To obtain a better model prediction result, model training is performed on different data held by different data owners in a joint learning process.

Currently, how to ensure the security of private data during the joint learning process while taking into account the personalization of the model has become a problem to be solved.

SUMMARY

One or more embodiments of this specification provide a method for training a privacy preserving model. The method is implemented by one of a plurality of data parties that participate in the training, the method includes performing a plurality of rounds of iterative updates to a model held by the data party, and the model includes a shared portion and a dedicated portion. A round of iterative update includes: iterative training is performed on the model based on one or more training samples held by the data party to obtain model data, where the model data include first shared data corresponding to the shared portion of the model and local data corresponding to the dedicated portion of the model, and the iterative training further includes adding a perturbation to the first shared data corresponding to the shared portion of the model to apply privacy preserving on at least the first shared data in the model data; the first shared data are transmitted to a server, so that the server determines second shared data based on first shared parameters of the plurality of data parties; the second shared data returned by the server are obtained, and the shared portion of the model is updated based on the second shared data; and a next round of iterative update is performed based on an updated model, or the updated model is used as a final model.

One or more embodiments of this specification provide a system for training a privacy preserving model. The system is implemented by one of a plurality of data parties that participate in the training, the system is configured to perform a plurality of rounds of iterative updates to a model held by the data party, the model includes a shared portion and a dedicated portion, and the system includes a model training module, a data transmission module, a second updating module, and a determining module. In a round of iterative update, the model training module is configured to perform iterative training on the model based on one or more training samples held by the data party to obtain model data, where the model data include first shared data corresponding to the shared portion of the model and local data corresponding to the dedicated portion of the model, and the iterative training further includes adding a perturbation to the first shared data corresponding to the shared portion of the model to apply privacy preserving on at least the first shared data in the model data; the data transmission module is configured to transmit the first shared data to a server, so that the server determines second shared data based on first shared parameters of the plurality of data parties; the second updating module is configured to obtain the second shared data returned by the server, and update the shared portion of the model based on the second shared data; and the determining module is configured to perform a next round of iterative update based on an updated model, or use the updated model as a final model.

One or more embodiments of this specification provide an apparatus for training a privacy preserving model. The apparatus includes a processor, and the processor is configured to perform the method for training a privacy preserving model described above.

One or more embodiments of this specification provide another method for training a privacy preserving model. The method is implemented by a server, the method includes performing a plurality of rounds of iterative updates to a model held by a data party, and the model includes a shared portion and a dedicated portion. A round of iterative update includes: first shared data of K data parties are obtained, where the K data parties are specified from M data parties, both M and K are positive integers, K≤M, and the first shared data correspond to the shared portion of the model of the data party; second shared data are determined based on the first shared data of the K data parties; and the second shared data are sent to the M data parties, so that the data parties update shared portions of models of the data parties based on the second shared data.

One or more embodiments of this specification provide another system for training a privacy preserving model. The system is implemented by a server, the system is configured to perform a plurality of rounds of iterative updates to a model held by a data party, the model includes a shared portion and a dedicated portion, and the system includes a data acquisition module, a shared data determining module, and a transmission module. In a round of iterative update, the data acquisition module is configured to obtain first shared data of K data parties, where the K data parties are specified from M data parties, both M and K are positive integers, K≤M, and the first shared data correspond to the shared portion of the model of the data party; the shared data determining module is configured to determine second shared data based on the first shared data of the K data parties; and the transmission module is configured to send the second shared data to the M data parties, so that the data parties update shared portions of models of the data parties based on the second shared data.

One or more embodiments of this specification provide an apparatus for training a privacy preserving model, including a processor. The processor is configured to perform the method for training a privacy preserving model described above.

BRIEF DESCRIPTION OF DRAWINGS

This specification is further described by using example embodiments, and these example embodiments are described in detail with reference to the accompanying drawings. These embodiments are not limiting. In these embodiments, the same reference numeral represents the same structure.

DESCRIPTION OF EMBODIMENTS

Figure 1:
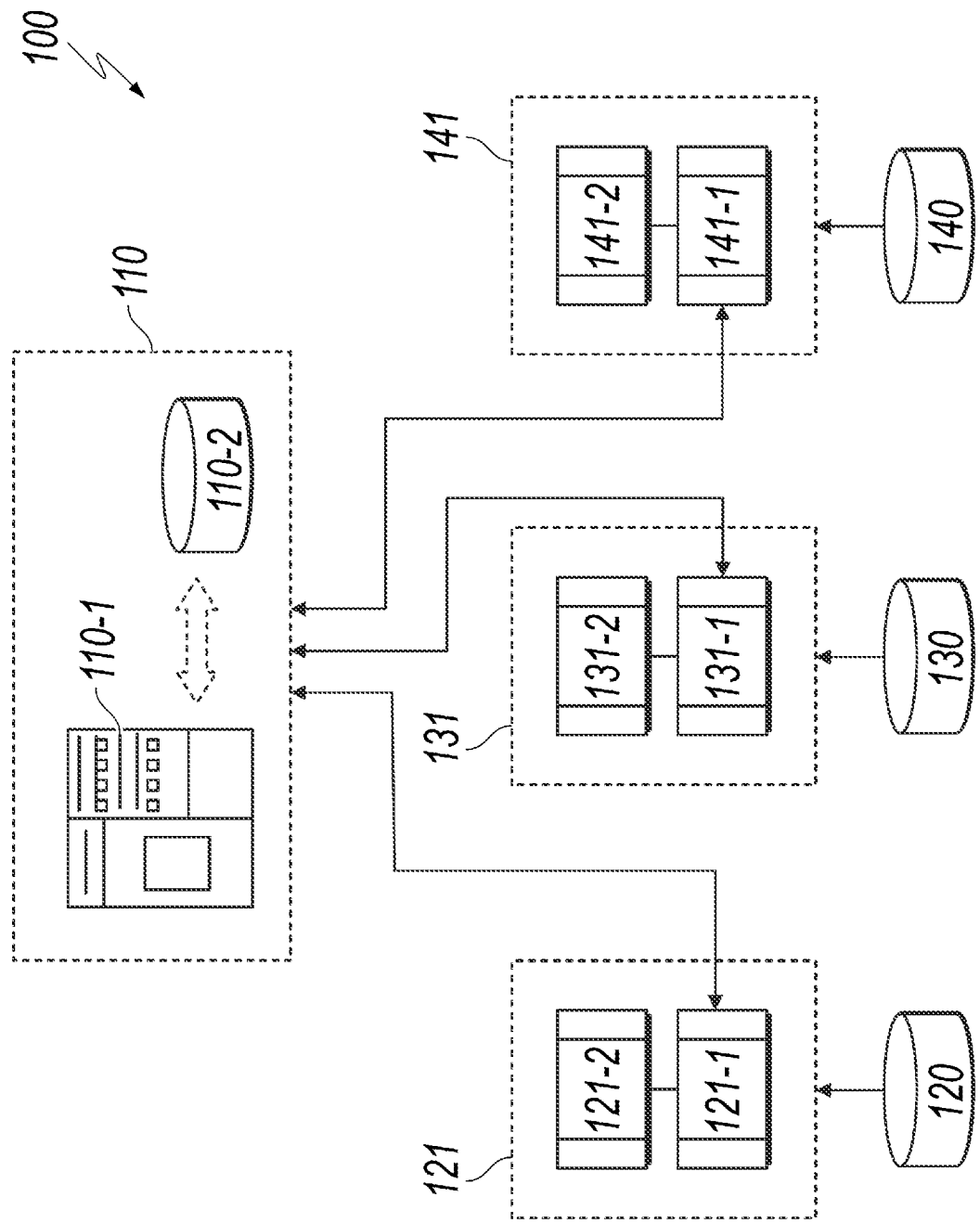
FIG. 1 is a schematic diagram illustrating an application scenario of a system for training a privacy preserving model, according to some embodiments of this specification.

To describe the technical solutions in embodiments of this specification more clearly, the following briefly describes the accompanying drawings needed for describing the embodiments. Clearly, the accompanying drawings in the following description are merely some examples or embodiments of this specification. A person of ordinary skill in the art can still apply this specification to other similar scenarios based on these accompanying drawings without creative efforts. Unless clear from the language environment or otherwise stated, the same reference numeral in the figure represents the same structure or operation.

It should be understood that the terms "system", "apparatus", "unit", and/or "module" used here are used to distinguish between different components, elements, parts, portions, or assemblies of different levels. However, if other terms can achieve the same purpose, the term can be replaced by other expressions.

As shown in this specification and the claims, the terms "one", "a", and/or "the", etc. is unnecessarily in a singular form, and can be in a plural form unless the context expressly suggests exceptions. Generally, the terms "include" and "contain" indicate only those steps and elements that have been explicitly identified, these steps and elements do not constitute an exclusive listing, and the method or device can also include other steps or elements.

A flowchart is used in this specification to describe operations performed by a system according to embodiments of this specification. It should be understood that the operations may not be precisely performed in sequence. Instead, the steps can be processed in reverse sequence or simultaneously. In addition, other operations can be added to these processes, or one or more operations can be removed from these processes.

With popularity of mobile terminals such as mobile phones, tablets, and wearable devices, hundreds of millions of massive data related to individual behavior activities are also generated accordingly. As a storage and computation capability of a mobile terminal device improves and an individual's need for privacy preserving of behavior-related data increases, there is an urgent need for a new algorithm that protects private data from leaving the domain and transfer a platform computation to a terminal.

Federated learning performs machine learning on a terminal device by combining computing power and data on different terminals, so as to ensure that individual data do not leave the domain. In addition, gradients are aggregated to combine terminal devices to perform joint training, thereby improving generalization of an overall model. However, it is difficult for a conventional federated learning framework (for example, FedAvg) to resolve a problem of model personalization, and improvement in generalization of the model usually results in a loss in personalization. Specifically, in some embodiments, federated learning is performed based on shared gradients rather than shared training sample data to reduce privacy leakage. However, because models of the terminal devices need to process different tasks, a common model obtained through joint learning in this method usually does not perform better on an end side. In addition, there is a risk of data leakage during data (for example, model parameters and/or gradients) sharing in joint training. In some embodiments, security of shared data is protected through secure multi-party computation (MPC) or homomorphic encryption (HE). However, this causes a problem of a large computation amount and a large communication amount.

Based on this, in some embodiments of this specification, a method for training a privacy preserving model based on multi-task learning joint modeling is proposed, so as to implement joint training and obtain a personalized end-side model while ensuring that data on each end side do not leave the domain. The following describes the method in detail.

FIG. 1 is a schematic diagram illustrating an application scenario of a system for training a privacy preserving model, according to some embodiments of this specification. As shown in FIG. 1, the scenario 100 can include a server 110 and a plurality of data parties that participate in the training. The plurality of data parties include a first data party 120, a second data party 130, and a third data party 140. The data party can also be referred to as a training member. For example, the first data party 120 can also be referred to as a first training member 120, the second data party 130 can also be referred to as a second training member 130, and the third data party 140 can also be referred to as a third training member 140. In addition, the server 110 also participates in model training. In this specification, the server 110 can also be referred to as a training member, for example, a fourth training member. It is worthwhile to note that FIG. 1 is merely used as an example for description. In FIG. 1, there are possibly four data parties, namely, four training members. In other embodiments, a fifth data party, a sixth data party, until an $N^{th}$ data party can further be included.

The server 110 can be a device such as a cloud server with a data acquisition, storage, and/or sending function, or can be a terminal processing device. In some embodiments, the server 110 can receive related data from the first data party 120, the second data party 130, and the third data party 140. For example, the server 110 can receive first shared data sent from the first data party 120.

In some embodiments, the server 110 can include a processing device 110-1 and a storage device 110-2. The processing device 110-1 can be configured to process data. For example, the processing device 110 can determine second shared data based on a plurality of first shared data uploaded by the training members, and send the second shared data to each training member. In some embodiments, the processing device 110-1 can be an independent server or a server group. The server group can be in a centralized or distributed form (for example, the processing device 110-1 can be a distributed system). In some embodiments, the processing device 110-1 can perform execution on a cloud platform. For example, the cloud platform can include one or any combination of a private cloud, a public cloud, a hybrid cloud, a community cloud, a distributed cloud, an internal cloud, etc. In some embodiments, the processing device 110-1 can include one or more processing sub-devices (for example, a single-chip processing device or a multi-core multi-chip processing device). As an example only, the processing device 110-1 can include a central processing unit (CPU), an application-specific integrated circuit (ASIC), an application-specific instruction processor (ASIP), a graphics processing unit (GPU), a physical processing unit (PPU), a digital signal processor (DSP), a field programmable gate array (FPGA), a programmable logic circuit (PLD), a controller, a microcontroller unit, a reduced instruction set computer (RISC), a microprocessor, or any combination of the above processing devices.

In some embodiments, the storage device 110-2 can be configured to store data. For example, the storage device 110-2 can store the plurality of first shared data uploaded the training members, and/or system data and/or system instructions. The processing device 120-1 can implement the example methods in this specification by executing or using the system data and/or the system instructions. For example, the processing device 130-1 can determine and transmit the second shared data by using the system data and/or executing the system instructions. In some embodiments, the storage device can include a large-capacity memory, a removable memory, a volatile read-write memory, a read-only memory (ROM), or any combination of the above storage devices. In some embodiments, the storage device 110-2 can be a part of the processing device 110-1.

The first data party 120, the second data party 130, and the third data party 140 each can be a device with a data acquisition, storage, and/or sending function. In some embodiments, the first data party 120, the second data party 130, and the third data party 140 can include but are not limited to a mobile device, a tablet computer, a laptop computer, a desktop computer, or any combination of the above devices. In some embodiments, the first data party 120, the second data party 130, and the third data party 140 can send or receive related data of the server 110. For example, the first data party 120 can send the first shared data in a model held by the data party to the server 110. For another example, the first data party 120 can receive the second shared data determined by the server 110.

In some embodiments, the first data party 120, the second data party 130, and the third data party 140 each can include a processing device and a storage device. The processing device of the data party can process data and/or execute instructions. For example, the processing device of the data party (for example, the first data party 120, the second data party 130, or the third data party 140) can perform one or more times of iterative training on a model based on one or more training samples held by the data party to obtain model data. The storage device of the data party can store data and/or instructions. For example, the storage device stores one or more training samples used for model training and a model, and also stores related instructions for driving the corresponding processing device to perform an operation. The processing device can implement the example methods in this specification by executing these instructions. In some embodiments, the storage device of the data party can further store data obtained after processing by the corresponding processing device. For example, the storage device can store model data obtained after the processing device performs one or more times of iterative training on the model based on the one or more training samples held by the data party that includes the processing device. In some embodiments, the storage device can include a large-capacity memory, a removable memory, a volatile read-write memory, a read-only memory (ROM), or any combination of the above storage devices.

In some embodiments, the plurality of data parties can cooperate with the server to jointly train a model based on a multi-party sharing learning (for example, federated learning) method. As such, the parties cooperative with each other to train a machine learning model to be used by the plurality of parties while data security of the parties is ensured. Unlike a conventional federated learning framework, in one or more embodiments of this specification, the plurality of data parties jointly train a model by sharing a part of information (for example, model-related parameters and/or gradients), so that the model on each end side can better satisfy a processing task of the model while a model generalization capability is improved. In addition, the part of shared information is perturbed to further protect the data.

In some embodiments, the first data party 120, the second data party 130, and the third data party 140 each can hold a model. The models held by the data parties can have the same model structure. The same model structure can refer to the same dimension of model parameters and/or the same arrangement location of each parameter in the model. For example, the models held by the data parties can be neural network models with the same network structure. Each model can include a shared portion and a dedicated portion. The shared portion can be a model portion used for joint training, and related data (for example, model parameters and/or gradients) in this portion are used for sharing training (for example, aggregation and optimization). The dedicated portion can be a model portion that the data party performs independent training based on self-held data. Related data in this portion do not leave the domain, and are locally trained to achieve the purpose of model personalization. For example, assume that the model held by each data party is a neural network, and the neural network includes 10 neural network layers. In this case, the shared portion of the model can be the first six layers of the neural network, and the dedicated portion can be the last four layers of the neural network. It is worthwhile to note that division of the shared portion and the dedicated portion of the model can alternatively be in other forms. For example, the shared portion is the first two layers of the neural network, and the dedicated portion is the last eight layers of the neural network. For another example, the shared portion is the third to fifth layers of the neural network, and the remaining neural network layers are the dedicated portion. In some embodiments, the models held by the data parties can have different model structures, for example, shared portions of the models of the data parties have the same model result, while dedicated portions have different structures.

Still referring to FIG. 1, the first data party 120, the second data party 130, and the third data party 140 can hold models respectively corresponding to the data parties, such as a first model 121, a second model 131, and a third model 141. The first model 121 includes a first shared portion 121-1 and a first dedicated portion 121-2, the second model 131 includes a second shared portion 131-1 and a second dedicated portion 131-2, and the third model 141 includes a third shared portion 141-1 and a third dedicated portion 141-2.

During training, each data party can transmit model data corresponding to the shared portion of the model of the data party to the server 110 for processing. For example, the first data party 120 can send model parameters (for example, the first shared data) in the first shared portion 121-1 of the held first model 121 to the server 110 for processing. Each data party can further receive processed model data returned by the server 110. For example, the first data party 120 can receive the second shared data returned by the server 110.

In some embodiments, the server 110 can receive related model data in the shared portions of the models sent by the data parties, process these model data to obtain processing, and then feed back the processed data to the data parties. For example, the server 110 can receive model data (for example, the first shared data) that are sent by the data parties and that correspond to the shared portions of the models respectively held by the data parties, and then determine optimized model data (for example, the second shared parameters) based on these data, and feed back the optimized model data to the data parties.

The following describes the technical solutions claiming protection in this specification by using a flowchart.

Figure 2:
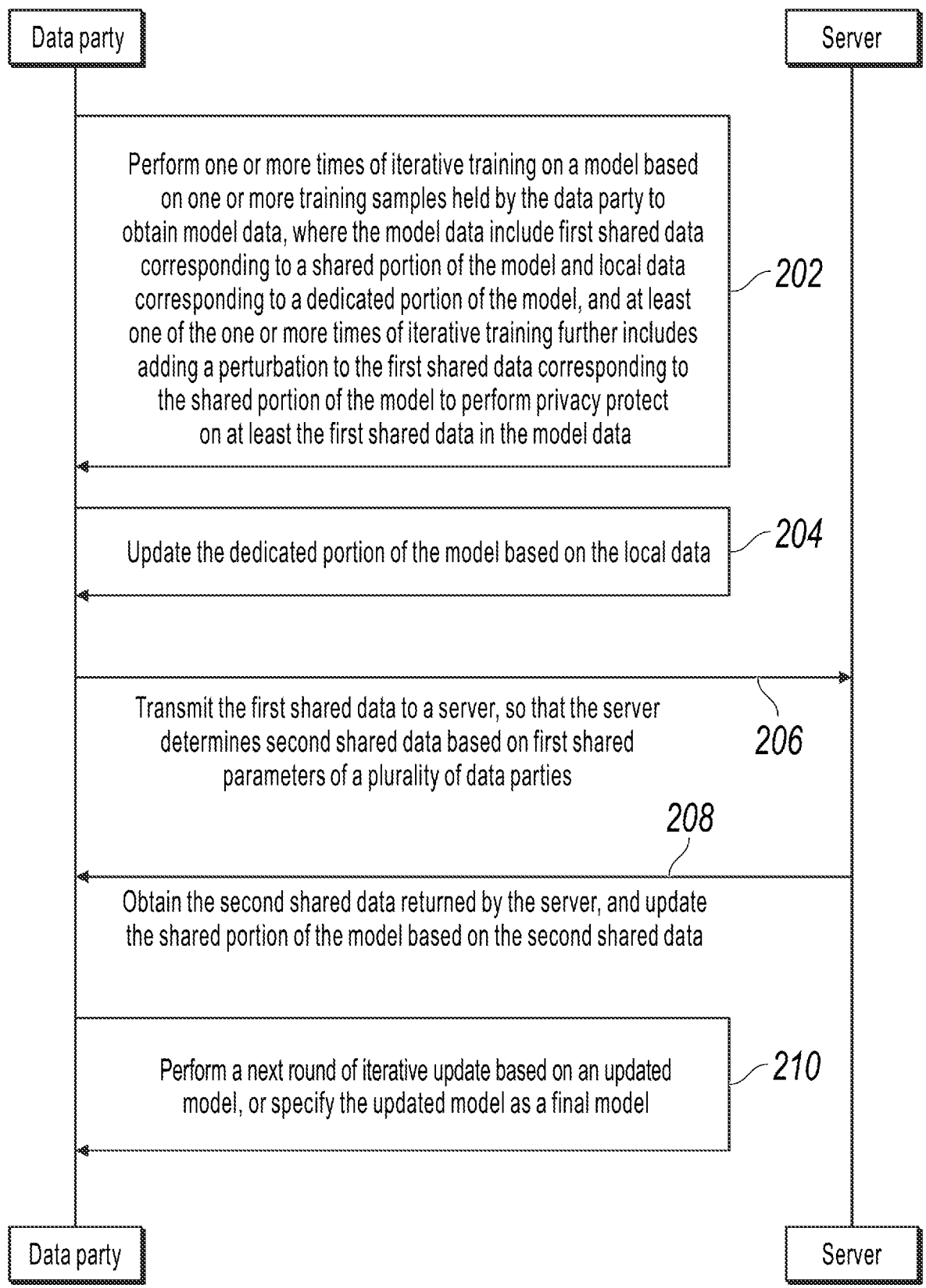
FIG. 2 is an example interaction flowchart illustrating a method for training a privacy preserving model, according to some embodiments of this specification.

FIG. 2 is an example interaction flowchart of a method for training a privacy preserving model, according to some embodiments of this specification. The method can be implemented by one of a plurality of data parties that participate in the training (for example, the first data party 120, the second data party 130, or the third data party 140 in FIG. 1). For example, the procedure 200 can be stored in a storage device (for example, a storage device that comes with the first data party 120, the second data party 130, or the third data party 140, or an external storage device) in a form of a program or instruction. The procedure 200 can be implemented when the program or the instruction is executed. In some embodiments, a plurality of rounds of iterative updates can be performed to a model held by the data party, where the model includes a shared portion and a dedicated portion. The procedure 200 can be a round of iterative procedure in the plurality of rounds of iterative updates to the model. In some embodiments, the procedure 200 can be performed by a first model training system 500. The first model training system 500 can be integrated into the data party. The following describes the procedure 200 in detail.

Step 202: Perform one or more times of iterative training on the model based on one or more training samples held by the data party to obtain model data. The step can be performed by a model training module 510.

In some embodiments, the one or more training samples held by the data party can be one or more training samples determined based on data generated during use of the data party. It can be understood that, because use habits and/or preferences of users of the data parties are different, generated data are also different. Therefore, training samples held by different data parties are different either.

In some embodiments, model parameters in the model can be randomly initialized before the data party trains the held model (for example, before the plurality of rounds of iterative updates are performed). In other words, models held by the data parties can have the same model structure, but initial model parameters in the models can be different.

One time of iterative training can be understood as a process of updating model parameters by using one training sample. In this step, the data party can perform iterative training on the model by using one training sample or one batch of training samples of the data party, and use model parameters obtained after the iterative training or gradient data obtained after the last iteration as the model data. One batch can include a plurality of training samples, such as 100, 500, or 1000 training samples. In some embodiments, a quantity of the one or more times of iterative training can be predetermined. For example, in a joint training process, the data parties need to transmit shared data to a server for aggregation and optimization. There is a certain time interval between two adjacent transmissions (which can also be referred to as a communication interval). During this communication interval, the data party can perform a round of iterative update to the model. A quantity of iterative training times in a round of iterative update can be determined based on a specified length of the communication interval. In addition, optimal setting of the communication interval (for example, a relatively short communication interval is set) can facilitate convergence in the model training process while avoiding high communication costs. It can be understood that iterative training processes in the one or more times of iterative training performed on the model by the data party can be the same or similar. One time of iterative training is described below based on FIG. 3. In one time of iterative training, the model training module 510 can input feature data of the one or more training samples to the model to obtain an output result, and update the parameters in the model based on a back propagation algorithm by using the output result and label data corresponding to the one or more training samples.

In some embodiments, the model training module 510 can determine the model data after the one or more times of iterative training. The model data can include model parameters or gradient data obtained after the one or more times of iterative training, for example, model parameters updated after the one or more times of iterative training, or gradients corresponding to model parameters determined in a last iterative training process in the one or more times of iterative training. It is not difficult to understand that the model parameters can be divided into first shared data corresponding to the shared portion of the model and local data corresponding to the dedicated portion of the model. For example, assume that the model is a neural network model that includes 10 neural network layers, the first six neural network layers are the shared portion of the model, and the last four neural network layers are the dedicated portion of the model. In this case, the model data can include updated model parameters at the first six neural network layers or gradients corresponding to the model parameters obtained after the one or more times of iterative training. These updated model parameters or gradients can be referred to as the first shared data. The model data further include updated model parameters at the last four neural network layers or gradients corresponding to the model parameters. These updated model parameters or gradients can be referred to as the local data.

In some embodiments, in at least one of the one or more times of iterative training, the model training module 510 can add a perturbation to the first shared data corresponding to the shared portion of the model to apply privacy preserving on at least the first shared data in the model data. The method for adding a perturbation can include performing a local differential privacy operation on the first shared data, for example, adding noise to the first shared data. For detailed descriptions of one time or iterative training, references can be made to another part of this specification, for example, FIG. 3.

Step 204: Update the dedicated portion of the model based on the local data. The step can be performed by a first updating module 520 of the model.

In some embodiments, the first updating module 520 can directly use the updated model parameters included in the local data as model parameters in the dedicated portion of the model. In this case, the model parameters in the dedicated portion of the model are updated as the one or more times of iterative training are completed. In some embodiments, the first updating module 520 can update the model parameters in the dedicated portion of the model by using the gradients included in the local data. For example, the first updating module 520 can subtract the product of a learning rate and gradients obtained in an $n^{th}$ time of iterative training from model parameters obtained in an $(n-1)^{th}$ time of iterative training, to update the model parameters in the dedicated portion, where n is a total quantity of the one or more times of iterative training, and is an integer greater than 1.

Step 206: Transmit the first shared data to a server, so that the server determines second shared data based on first shared parameters of the plurality of data parties. The step can be performed by a data transmission module 530.

It can be understood that the plurality of parties need to share data when jointly training a model. In this case, the first shared data can be considered as data shared by the data parties in a process of jointly training the model. It is worthwhile to note the first shared data are not original data held by the data party, but are model parameters or gradients in a shared portion of an updated model obtained after the one or more times of iterative training. In some embodiments, the data transmission module 530 can transmit the first shared data to the server after the one or more times of iterative training.

In some embodiments, after receiving the first shared data transmitted by the data party, the server can process the first shared data to obtain the second shared data. For example, the second shared data can be obtained after the server performs an operation, for example, a summation operation or an averaging operation, on the plurality of first shared data transmitted by the plurality of data parties.

Referring back to FIG. 1, as shown in FIG. 1, the plurality of data parties (the first data party 120, the second data party 130, and the third data party 140) can transmit, to the server 110, shared data corresponding to the shared portions (for example, the first shared portion 121-1, the second shared portion 131-1, and the third shared portion 141-1) of the models respectively obtained by the data parties after the one or more times of iterative training, so that the server 110 can determine optimized shared data (for example, the second shared data) based on the plurality of shared data (for example, the first shared data).

In some embodiments, the data party can transmit the first shared data to the server based on an instruction of the server. For example, after receiving an upload instruction of the server, the data party transmits the first shared data to the server. If the data party does not receive the upload instruction of the server, the data party does not upload the first shared data.

Step 208: Obtain the second shared data returned by the server, and update the shared portion of the model based on the second shared data. The step can be performed by a second updating module 540.

In some embodiments, the second updating module 540 can use the second shared data as model parameters in the shared portion of the model. In this case, the first shared data transmitted by the plurality of data parties are updated model parameters in shared portions of the models of the plurality of data parties, and the second shared data can be determined by the server based on the updated model parameters in the shared portions transmitted by the plurality of data parties. The second updating module 440 can directly replace the model parameters in the shared portion of the model with the second shared data.

In some embodiments, the second updating module 540 can update the shared portion of the model based on a learning rate and the second shared data. The learning rate can be used to control a learning progress of the model, and can be understood as a stride in a back propagation algorithm. In this case, the first shared data transmitted by the plurality of data parties are gradient data corresponding to the shared portions of the models of the plurality of data parties (for more descriptions of the gradient data, references can be made to related descriptions in step 202), and the second shared data can be determined by the server based on gradients corresponding to model parameters in the shared portions of the models transmitted by the plurality of data parties. The second updating module 540 can subtract the product of corresponding gradients in the second shared data and the learning rate from the model parameters in the shared portion of the model to update the model parameters in the shared portion of the model.

Referring back to FIG. 1, as shown in FIG. 1, the plurality of data parties (the first data party 120, the second data party 130, and the third data party 140) that participate in the training can respectively obtain the second shared data returned by the server 110, and the plurality of data parties respectively update, based on the second shared data, the shared portions of the models respectively held by the plurality of data parties, for example, the first shared portion 121-1, the second shared portion 131-1, and the third shared portion 141-1.

Step 210: Perform a next round of iterative update based on an updated model, or specify the updated model as a final model. The step can be performed by a determining module 550.

In some embodiments, after the above steps (for example, step 202 to step 208) of the procedure 200 are completed, the determining module 550 can perform subsequent steps based on some conditions. For example, the determining module 550 can test, by using a test sample, performance of a model obtained after a current round of iterative update, and when a model performance parameter satisfies predetermined needs, the iterative update can stop. If it is determined that the model needs to continue to be optimized, the determining module 550 can use the model obtained after the current round of iterative update as an initial model in a next round of iterative update. If it is determined that the iterative update can stop, the determining module 450 can use the model obtained after the current round of iterative update as the final model.

In some embodiments, the determining module 550 can determine a specific round of the current iterative update in the one or more rounds of iterative updates. If the current iterative update is the first or middle round in the one or more rounds of iterations, the determining module 450 can determine that the model updating process does not end, and can perform a next round of iterative update based on the updated model. If the current iterative update is the last round in the one or more rounds of iterations, the determining module 550 can end the model updating process and specify the updated model as the final model.

It is worthwhile to note that the above descriptions of the steps in FIG. 2 are merely for example and description, and do not limit the applicable scope of this specification. A person skilled in the art can make various modifications and changes on the steps in FIG. 2 under the guidance of this specification. However, these modifications and changes still fall within the scope of this specification.

Figure 3:
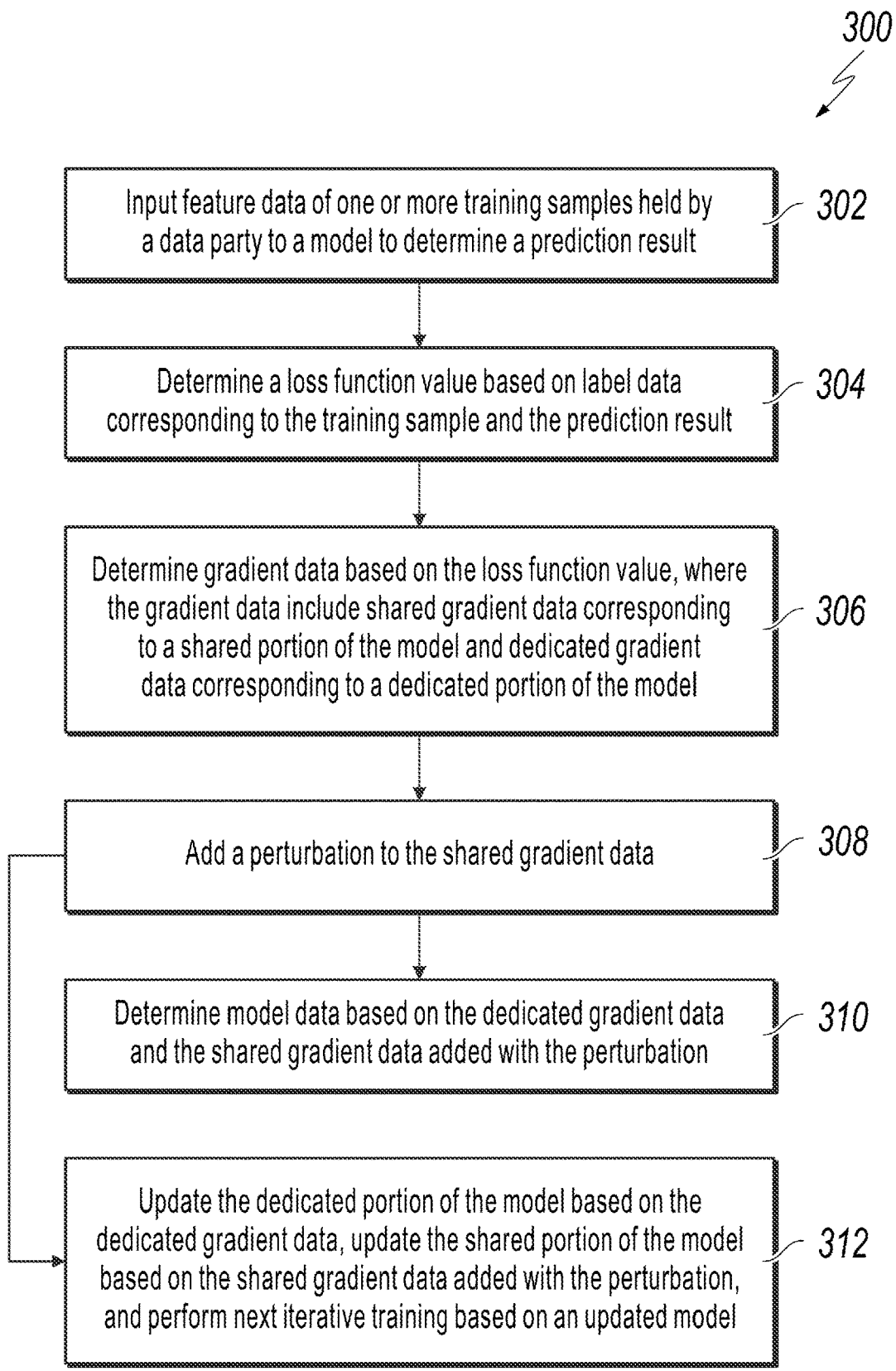
FIG. 3 is an example flowchart illustrating another method for training a privacy preserving model, according to some embodiments of this specification.

FIG. 3 is an example flowchart illustrating one time of iterative training in one or more times of iterative training, according to some embodiments of this specification. The method can be implemented by one of a plurality of data parties that participate in the training (for example, the first data party 120, the second data party 130, or the third data party 140 in FIG. 1). For example, the procedure 300 can be stored in a storage device (for example, a self-contained storage device of the first data party 120, the second data party 130, or the third data party 140, or an external storage device) in a form of a program or instruction. The procedure 300 can be implemented when the program or the instruction is executed. In some embodiments, the procedure 300 can be performed by a first model training system 500. The first model training system 500 can be integrated into the data party. In some embodiments, the procedure 300 can be performed by a model training module 510. The following describes the procedure 200 in detail.

Step 302: Input feature data of one or more training samples held by the data party to a model to determine a prediction result.

In some embodiments, the model training module 510 can process, by using a feature extraction algorithm, the one or more training samples held by the data party to obtain the feature data of the one or more training samples. Example feature extraction algorithms can include a principal components analysis (PCA) algorithm, an independent components analysis (ICA) algorithm, linear discriminant analysis (LDA), sparse coding, etc. It is worthwhile to note that the model training module 510 can select different feature extraction algorithms based on different types of training sample data and different fields of the training sample data. The above examples are merely for the purpose of description, and implementations are not limited in this specification.

In some embodiments, the prediction result can be an output obtained after the model processes the feature data of the one or more training samples. For example, the model is a neural network. After inputting the feature data of the one or more training samples to the model, the model training module 510 performs forward propagation, and the model can obtain a final output. For example, assume that the model is a model used for classification or recommendation, the output can be a value in classification results such as 0 and 1, or a predicted recommended object. 1, 0, or the predicted recommended object is the prediction result.

Step 304: Determine a loss function value based on label data corresponding to the one or more training samples and the prediction result.

In some embodiments, the label data corresponding to the one or more training samples can be a standard processing result of the one or more training samples. For example, assume that a training sample (for example, a picture including an animal) is a sample used to train a classification model (for example, used to recognize whether the animal included in the picture is a cat or another animal), the label data of the training sample can be a category of the animal included in the picture. If the animal in the picture is a cat, the label data can be 1. If the animal in the picture is another animal other than a cat, the label data can be 0.

In some embodiments, the loss function value can be a value used to measure a difference between the output of the model for a training sample (for example, the prediction result) and a real value (for example, the label data). The model training module 510 can substitute the prediction result and the label data to a loss function to determine the loss function value. For example, a loss function of the model used for classification (for example, binary classification) can be a cross-entropy loss function, as described below:

$$L=-[y \log \hat{y}+(1-y)\log(1-\hat{y})]$$

y represents the label data, and $\hat{y}$ represents the prediction result. The model training module 510 can obtain the loss function value through calculation.

Step 306: Determine gradient data based on the loss function value. The gradient data include shared gradient data corresponding to a shared portion of the model and dedicated gradient data corresponding to a dedicated portion of the model.

In some embodiments, the model training module 510 can determine the gradient data by using a back propagation algorithm. The back propagation algorithm can be used to determine changes (which can also be referred to as gradients or error derivatives) of the loss function relative to the parameters in the model. The model training module 510 can determine partial derivatives of the parameters in the model with respect to the loss function value to determine the gradients (which can be referred to as gradient data or gradient information). For example, the model is a neural network model. Assume that the neural network model includes m neural network layers, the model training module 510 can first determine partial derivatives of model parameters (for example, a weight $w_m$ and/or a constant term $b_m$) at a last neural network layer with respect to the loss function value, and the partial derivatives are denoted as $$g_{\{m\}} = \nabla f_{\{m\}}(w_m) = \frac{\partial \text{Loss}}{\partial w_m},$$

where Loss represents the loss function value. Then, the model training module 510 can subtract the product of the determined gradients and a learning rate from the original model parameters at the last neural network layer to obtain updated model parameters at the last neural network layer. For example, the model parameters can be updated based on the following formula: $w'_m=w_m-\gamma g_{\{m\}}$, where $w'_m$ represents the updated model parameters, and $\gamma$ represents the learning rate, which can also be referred to as an updating stride. Based on a chain rule, the model training module 510 can determine, from the back to the front, gradients corresponding to model parameters at the neural network layers.

Because the model includes the shared portion and the dedicated portion, the gradient data can also include the shared gradient data corresponding to the shared portion of the model and the dedicated gradient data corresponding to the dedicated portion of the model. For example, gradient data corresponding to model parameters in the shared portion of the model can be referred to as the shared gradient data, and gradient data corresponding to model parameters in the dedicated portion of the model can be referred to as the dedicated gradient data.

Step 308: Add a perturbation to the shared gradient data.

In some embodiments, the model training module 510 can add perturbation noise to the shared gradient data to complete perturbation of the shared gradient data so that privacy security of the data is further preserved.

In some embodiments, the model training module 510 can obtain a predetermined clipping threshold. The predetermined clipping threshold can be related to the shared gradient data, for example, related to sensitivity of the shared gradients. In some embodiments, the predetermined clipping threshold is related to a norm of the shared gradient data, and is usually at an order of magnitude the same as the norm of the gradients. For example, if a range of the shared gradient data is the units' digit, the predetermined clipping threshold can be 1. It is worthwhile to note that, for the training members (data parties), the predetermined clipping thresholds can be the same (for example, the predetermined clipping thresholds are unified before training), or can be different (for example, the training members set the predetermined clipping thresholds). A value of an element in the shared gradient data is limited to prevent an absolute value of any element in the shared gradient data from exceeding the predetermined clipping threshold; noise data are generated; and the noise data are superimposed on the shared gradient data to obtain the shared gradient data added with the perturbation.

In some embodiments, the model training module 510 can limit the value of the element in the shared gradient data to prevent the absolute value of any element in the shared gradient data from exceeding the predetermined clipping threshold. Before the perturbation noise is added to the shared gradient data, the value of the element in the shared gradient data needs to be limited based on the predetermined clipping threshold. For example, when the absolute value of the element in the shared gradient data is greater than the predetermined clipping threshold, the value of the element can be replaced with the predetermined clipping threshold, and a symbol of the element remains unchanged, to be specific, the original element is a negative number, and the replaced element value is a negative predetermined clipping threshold. When the absolute value of the element in the shared gradient data is not greater than the predetermined clipping threshold, the element remains unchanged.

In some embodiments, the model training module 510 can generate the noise data. The noise data can include Gaussian noise. The Gaussian noise follows a normal distribution $N(0,\sigma^2)$. A variance $\sigma^2$ of the Gaussian noise can be determined based on the predetermined clipping threshold, a privacy budget, and a relaxation term. For example, the variance of the Gaussian noise can be determined based on the following formula:

$$\sigma = \frac{\sqrt{2\ln(1.25/\delta)}\,(\Delta f)}{\epsilon}$$

$\delta$ represents the relaxation item and can range from 10 to 5. $\epsilon$ represents the privacy budget, and can be a value within (0, 1). $\Delta f$ represents sensitivity of the shared gradient data. $\Delta f$ can be related to clipping strength, for example, $\Delta f$ can be equal to the predetermined clipping threshold. In some embodiments, the variance of the Gaussian noise can alternatively be determined by using other steps or formulas. Implementations are not limited in this specification. In some embodiments, the noise data can alternatively be of other noise types, such as Laplacian noise and Poisson noise.

In some embodiments, the model training module 510 can superimpose the noise data on the shared gradient data to obtain the shared gradient data added with the perturbation. In some embodiments, the model training module 510 can superimpose the noise data on the shared gradient data based on the following formula:

$$\tilde{g}_{\{M+1\}} = g_{\{M+1\}} + n, n \sim N(0,\sigma^2)$$

where $g_{\{M+1\}}$ represents the shared gradient data, n represents the noise data, and $\tilde{g}_{\{M+1\}}$ represents the shared gradient data added with the perturbation.

In some embodiments, after the above steps (for example, step 302 to step 308) of the procedure 300 are completed, the model training module 510 can perform a subsequent step (step 310 or step 312) based on some conditions.

Step 310: Determining the model data based on the dedicated gradient data and the shared gradient data added with the perturbation.

In some embodiments, when the current of iterative training is the last iteration in the one or more iterations, the model training module 510 can determine the model data based on the dedicated gradient data and the shared gradient data added with the perturbation. For example, the model training module 510 can determine the dedicated gradient data as local data corresponding to the dedicated portion of the model, and determine the shared gradient data added with the perturbation as first shared data of the shared portion of the model. In some embodiments, the model training module 510 can alternatively update original model parameters in the last iterative training based on the dedicated gradient data and the shared gradient data added with the perturbation, and determine updated model parameters as the model data. For example, assume that the model is a neural network model, the model training module 510 can subtract the product of determined gradients (including the dedicated gradient data and the shared gradient data added with the perturbation) and the learning rate from original model parameters in the neural network model in the current iterative training (the last iterative training), and use updated model parameters as the model data.

Step 312: Update the dedicated portion of the model based on the dedicated gradient data, update the shared portion of the model based on the shared gradient data added with the perturbation, and perform next iterative training based on an updated model.

In some embodiments, when the current iterative training is any of the one or more times of iterative training (not the last iterative training), the model training module 510 can separately update the dedicated portion and the shared portion of the model based on the dedicated gradient data and the shared gradient data added with the perturbation, and perform a next round of iterative training on the updated model. For example, assume that the model is a neural network model, the model training module 510 can subtract the product of determined gradients (including the dedicated gradient data and the shared gradient data added with the perturbation) and the learning rate from original model parameters in the neural network model in the current iterative training to obtain updated model parameters obtained in the current iterative training. For example, the model parameters can be updated based on the following formula: $w'_m = w_m - \gamma g_{\{m\}}$, where $w'_m$ represents the updated model parameters, $\gamma$ represents the learning rate, which can also be referred to as an updating stride, $w_m$ represents the original model parameters, and $g_{\{m\}}$ represents the gradients. It is worthwhile to note that, when original model parameters at a neural network layer are updated, gradient data used depend on a part of the model that includes the neural network layer. If the neural network layer belongs to the dedicated portion of the model, the gradient data used are the dedicated gradient data. If the neural network layer belongs to the shared portion of the model, the gradient data used are the shared gradient data added with the perturbation.

It is worthwhile to note that the above descriptions of the steps in FIG. 3 are merely for example and description, and do not limit the applicable scope of this specification. A person skilled in the art can make various modifications and changes on the steps in FIG. 3 under the guidance of this specification. However, these modifications and changes still fall within the scope of this specification. In addition, in the one or more times of iterative training, the perturbation can be added to only some iterative training, while the perturbation is not added to the remaining iterative training.

Figure 4:
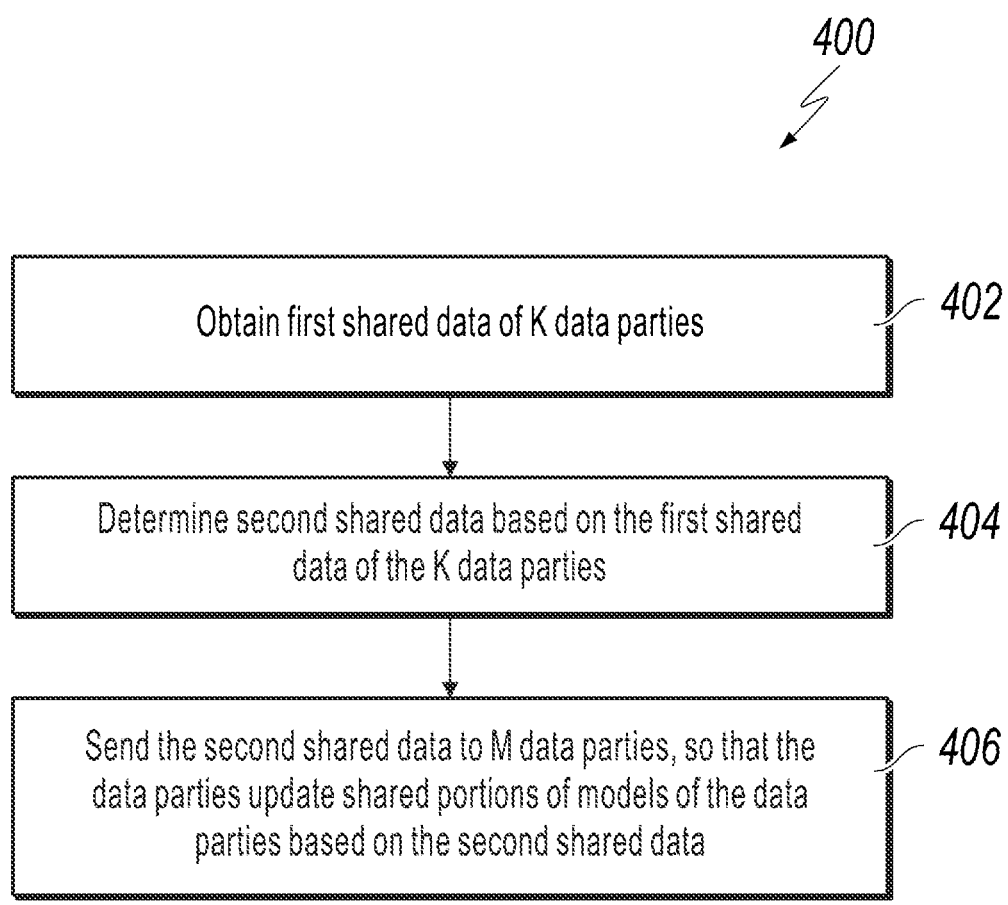
FIG. 4 is an example flowchart illustrating another method for training a privacy preserving model, according to some embodiments of this specification.

FIG. 4 is an example flowchart illustrating a method for training a privacy preserving model, according to some embodiments of this specification. The method is implemented by a server (for example, the server 110 in FIG. 1). For example, the procedure 400 can be stored in the storage device 110-2 in a form of a program or instruction, and the procedure 400 can be implemented when the program or instruction is executed. In some embodiments, a plurality of rounds of iterative updates can be performed to a model held by a data party, where the model includes a shared portion and a dedicated portion. The procedure 400 is a round of iterative procedure in the plurality of rounds of iterative updates. In some embodiments, the procedure 400 can be performed by a second model training system 600. The second model training system 600 can be integrated into the server. The following describes the procedure 400 in detail.

Step 402: Obtain first shared data of K data parties, where the K data parties are specified from M data parties, both M and K are positive integers, K≤M, and the first shared data correspond to the shared portion of the model of the data party. The step can be performed by a data acquisition module 610.

For descriptions of the first shared data and the shared portion of the model, references can be made to step 202 in the flowchart in FIG. 2 of this specification.

In some embodiments, the K data parties can be some or all of the M data parties that participate in joint model training, where both M and K are positive integers, and K≤M. Referring to FIG. 1, the K data parties can be one, two, or three of the first data party 120, the second data party 130, and the third data party 140. In some embodiments, the K data parties can be randomly specified from the M data parties. For example, the probabilities of all of the M data parties to be specified are the same, and the K data parties are randomly specified from the M data parties based on the same probability. For another example, the probabilities of the M data parties to be specified are different due to different executed tasks and importance of the tasks, and the K data parties are randomly specified from the M data parties based on the probabilities respectively corresponding to the data parties.

In some embodiments, the K data parties in each round of iterative update can include one or more different data parties in the M data parties. Therefore, quantities of K data parties and data parties in the K data parties can be different in the rounds of iterations.

The server can deliver an upload instruction to the specified K data parties, and the data parties receiving the upload instruction uploads the first shared data to the server. Step 404: Determine second shared data based on the first shared data of the K data parties. The step can be performed by a shared data determining module 620.

In some embodiments, the shared data determining module 620 can perform a mathematical operation on the obtained K first shared data to determine the second shared data. The mathematical operation can be a summation operation, a multiplication/division operation, an averaging operation, etc. In some embodiments, the shared data determining module 620 can perform a weighting operation on the obtained K first shared data to determine the second shared data. For example, the second shared data can be a weighted sum value or a weighted average value of the K first shared data. For example, the shared data determining module 620 can determine the second shared data based on the following formula:

$$\hat{w} = \Sigma_K p_m w_m,$$

where $\hat{w}$ represents the second shared data, $w_m$ represents the first shared data transmitted by one of the K data parties, and $p_m$ represents a weight corresponding to $w_m$.

Step 406: Send the second shared data to the M data parties, so that the data parties update shared portions of models of the data parties based on the second shared data. The step can be performed by a transmission module 630.

In some embodiments, the transmission module 630 can send the second shared data to the M data parties. After receiving the second sharing module, the data parties can update the shared portions of the models of the data parties based on the second shared data, for example, as described in step 208 in the procedure 200.

It is worthwhile to note that, the server 110 receives the first shared data obtained by the K data parties by performing self-model training, and sends the second shared data to (all) the M data parties to update model parameters of the M data parties, to complete a round of iterative training of the model. It helps improve model training efficiency while reducing a communication amount, so as to ensure that a model on each end side can obtain training knowledge of other data parties during each round of iterative training, thereby updating local model parameters.

It is worthwhile to note that the above descriptions of the steps in FIG. 4 are merely for example and description, and do not limit the applicable scope of this specification. A person skilled in the art can make various modifications and changes on the steps in FIG. 4 under the guidance of this specification. However, these modifications and changes still fall within the scope of this specification.

Figure 5:
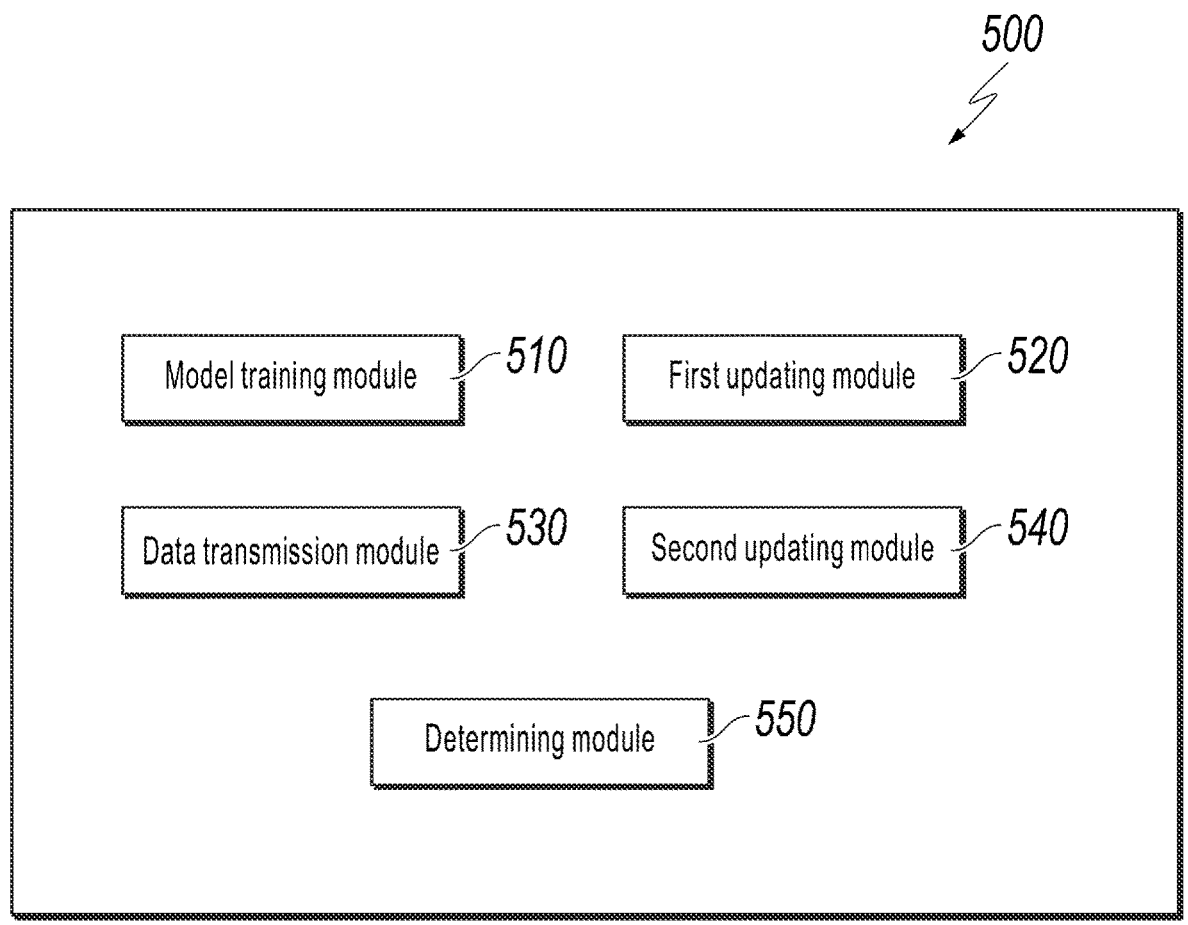
FIG. 5 is a diagram illustrating modules of a system for training a privacy preserving model, according to some embodiments of this specification.

FIG. 5 is an example diagram illustrating modules of a first model training system, according to some embodiments of this specification. The first model training system can implement the method for training a privacy preserving model. As shown in FIG. 5, the first model training system 500 can include a model training module 510, a first updating module 520, a data transmission module 530, a second updating module 540, and a determining module 550.

The model training module 510 can perform one or more times of iterative training on a model based on one or more training samples held by a data party to obtain model data. The one or more training samples held by the data party can be one or more training samples determined based on data generated during use of the data party. One time of iterative training can be understood as a process of updating a model parameter by using one training sample. In this step, the data party can perform iterative training on the model by using one training sample or one batch of training samples of the data party, and use model parameters obtained after the iterative training or gradient data obtained after the last iteration as the model data. The model data can include model parameters or gradient data obtained after the one or more times of iterative training, for example, model parameters updated after the one or more times of iterative training, or gradients corresponding to model parameters determined in a last iterative training process in the one or more times of iterative training. The model parameters can be divided into first shared data corresponding to a shared portion of the model and local data corresponding to a dedicated portion of the model.

In some embodiments, in at least one of the one or more times of iterative training, the model training module 510 can add a perturbation to the first shared data corresponding to the shared portion of the model to apply privacy preserving on at least the first shared data in the model data. The method for adding a perturbation can include performing a local differential privacy operation on the first shared data, for example, adding noise to the first shared data.

The first updating module 520 can update the dedicated portion of the model based on the local data. The first updating module 520 can directly use the updated model parameters included in the local data as model parameters in the dedicated portion of the model. The first updating module 520 can update the model parameters in the dedicated portion of the model by using the gradients included in the local data. For example, the first updating module 520 can subtract the product of a learning rate and gradients obtained in an $n^{th}$ time of iterative training from model parameters obtained in an $(n-1)^{th}$ time of iterative training, to update the model parameters in the dedicated portion.

The data transmission module 530 can transmit the first shared data to a server, so that the server determines second shared data based on first shared parameters of the plurality of data parties. The first shared data can be considered as data shared by the data parties in a process of jointly training the model, and includes model parameters or gradients in a shared portion of an updated model obtained after one or more times of iterative training. In some embodiments, after receiving the first shared data transmitted by the data party, the server can process the first shared data to obtain the second shared data. For example, the second shared data can be obtained after the server performs an operation, for example, a summation operation or an averaging operation, on the plurality of first shared data transmitted by the plurality of data parties. In some embodiments, the data party can transmit the first shared data to the server based on an instruction of the server. For example, after receiving an upload instruction of the server, the data party transmits the first shared data to the server. If the data party does not receive the upload instruction of the server, the data party does not upload the first shared data.

The second updating module 540 can obtain the second shared data returned by the server, and update the shared portion of the model based on the second shared data. The second updating module 540 can use the second shared data as model parameters in the shared portion of the model. In this case, the first shared data transmitted by the plurality of data parties are updated model parameters in shared portions of the models of the plurality of data parties. The second updating module 540 can update the shared portion of the model based on a learning rate and the second shared data. The second updating module 540 can subtract the product of corresponding gradients and the learning rate from the model parameters in the shared portion of the model to update the model parameters in the shared portion of the model.

The determining module 550 can perform a next round of iterative update based on an updated model, or can specify the updated model as a final model. The determining module 550 can test, by using a test sample, performance of a model obtained after a current round of iterative update, and when a model performance parameter satisfies predetermined needs, the iterative update can stop. If it is determined that the model needs to continue to be optimized, the determining module 550 can use the model obtained after the current round of iterative update as an initial model in a next round of iterative update. If it is determined that the iterative update can stop, the determining module 550 can use the model obtained after the current round of iterative update as the final model.

For other descriptions of the modules in FIG. 5, references can be made to flowcharts of this specification, for example, FIG. 2 and FIG. 3.

Figure 6:
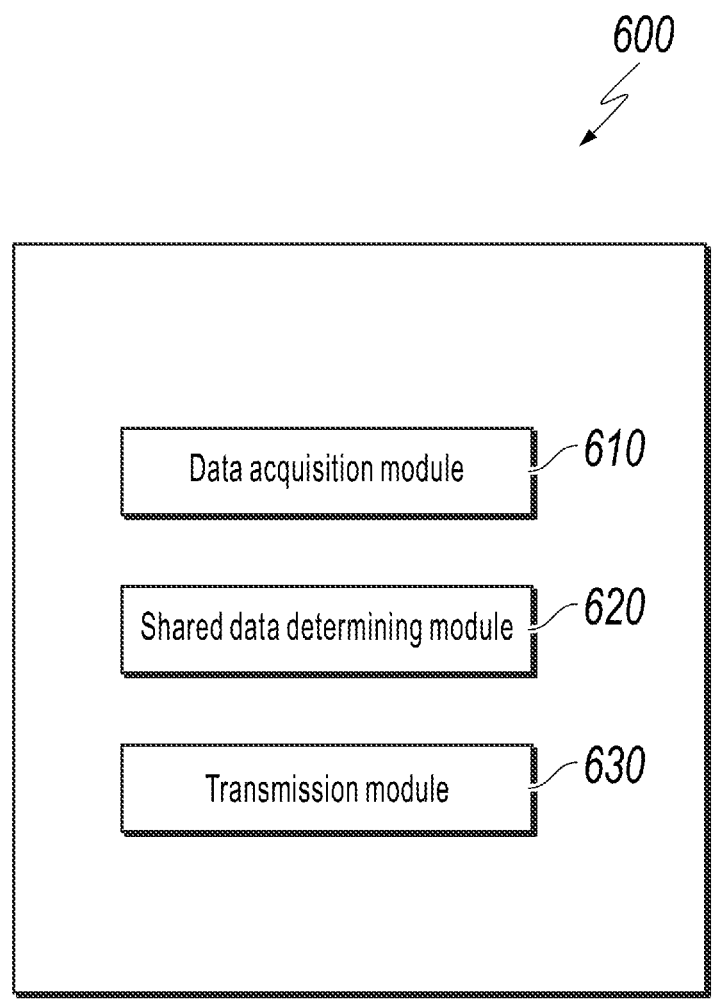
FIG. 6 is a diagram illustrating modules of another system for training a privacy preserving model, according to some embodiments of this specification.

FIG. 6 is an example diagram illustrating modules of a second model training system, according to some embodiments of this specification. The second model training system can implement the method for training a privacy preserving model. As shown in FIG. 6, the second model training system 600 can include a data acquisition module 610, a shared data determining module 620, and a transmission module 630.

The data acquisition module 610 can obtain first shared data of K data parties. The K data parties can be some or all of M data parties that participate in joint model training. The K data parties are specified from the M data parties, where both M and K are positive integers, and K≤M. In some embodiments, the first shared data correspond to a shared portion of a model of the data party.

The shared data determining module 620 can determine second shared data based on the first shared data of the K data parties. The shared data determining module 620 can perform a mathematical operation on the obtained K first shared data to determine the second shared data. The mathematical operation can be a summation operation, a multiplication/division operation, an averaging operation, etc. In some embodiments, the shared data determining module 620 can perform a weighting operation on the obtained K first shared data to determine the second shared data.

The transmission module 630 can send the second shared data to the M data parties, so that the data parties update shared portions of models of the data parties based on the second shared data. The transmission module 630 can send the second shared data to the M data parties. After receiving the second sharing module, the data parties can update the shared portions of the models of the data parties based on the second shared data. The server 110 receives the first shared data obtained by the K data parties by performing self-model training, and sends the second shared data to (all) the M data parties to update model parameters of the M data parties, to complete a round of iterative training of the model.

For other descriptions of the modules in FIG. 6, references can be made to a flowchart of this specification, for example, FIG. 4.

It should be understood that the systems and the modules of the systems shown in FIG. 5 and FIG. 6 can be implemented in various forms. For example, in some embodiments, the system and the modules of the system can be implemented by hardware, software, or a combination of software and hardware. The hardware part can be implemented by using dedicated logic. The software part can be stored in a memory and executed by an appropriate instruction execution system, for example, a microprocessor or specially designed hardware. A person skilled in the art can understand that the above methods and systems can be implemented by using computer-executable instructions and/or control code included in the processor. For example, such code is provided on a carrier medium such as a disk, a CD, or a DVD-ROM, a programmable memory such as a read-only memory (firmware), or a data carrier such as an optical or electronic signal carrier. The system and the modules of the system in this specification can be implemented not only by a hardware circuit of an ultra-large-scale integrated circuit or gate array, a semiconductor such as a logic chip or a transistor, or a programmable hardware device such as a field programmable gate array or a programmable logic device, but also by software executed by various types of processors, or can be implemented by a combination (for example, firmware) of the hardware circuit and software.

It is worthwhile to note that the above descriptions of the candidate item display and determining system and the modules of the system are merely used for convenient description, and cannot limit this specification to the scope of the enumerated embodiments. It can be understood that, after understanding the principle of the system, a person skilled in the art can randomly combine the modules or form a subsystem to be connected to another module without departing from the principle. For example, the first updating module 520 and the second updating module 540 in FIG. 5 can be two modules, or can be one module that simultaneously has functions of updating a shared portion and a local portion of a model. For another example, the modules can share one storage module, or the modules can respectively have storage modules. Such variations all fall within the protection scope of this specification.

Beneficial effects that can be brought by the embodiments of this specification include but are not limited to the following: Model parameters in all data parties are divided into two parts, where one part is shared parameters that participate in joint training, and the other part is local data related to a task executed by a model. Only the shared parameters participate in joint training, so as to ensure that each updated model is more suitable for processing a corresponding task on the premise that privacy leakage is reduced. In addition, privacy preserving of the data is further enhanced by locally performing differential privacy on the needed shared parameters (on the data party side). It is worthwhile to note that beneficial effects that can be generated in different embodiments are different. The beneficial effects that can be generated in different embodiments can be any one or a combination of several of the above beneficial effects, or can be any other beneficial effect possibly achieved.

Basic concepts have been described above. Clearly, for a person skilled in the art, the above detailed disclosure is merely an example, but does not constitute a limitation on this specification. Although not expressly stated here, a person skilled in the art can make various modifications, improvements, and amendments to this specification. Such modifications, improvements, and amendments are proposed in this specification. Therefore, such modifications, improvements, and amendments still fall within the spirit and scope of the example embodiments of this specification.

In addition, specific words are used in this specification to describe the embodiments of this specification. For example, terms such as "one embodiment", "an embodiment", and/or "some embodiments" mean a certain feature, structure, or characteristic related to at least one embodiment of this specification. Therefore, it is worthwhile to emphasize and note that "one embodiment", "an embodiment", or "an alternative embodiment" mentioned twice or more times in different locations in this specification does not necessarily refer to the same embodiment. In addition, some features, structures, or characteristics in one or more embodiments of this specification can be appropriately combined.

In addition, a person skilled in the art can understand that the aspects of this specification can be illustrated and described by using several patentable categories or cases, including any new and useful combination of processes, machines, products or substances, or any new and useful improvement to them. Correspondingly, the aspects of this specification can be completely executed by hardware, completely executed by software (including firmware, resident software, microcode, etc.), or can be executed by a combination of hardware and software. The above hardware or software can be referred to as a "data block", a "module", an "engine", a "unit", a "component", or a "system". In addition, the aspects of this specification can be represented by a computer product located in one or more computer-readable media, and the product includes computer-readable program code.

The computer storage medium possibly include a propagated data signal that includes computer program code, for example, located on a baseband or used as a part of a carrier. The propagated signal can have a plurality of representation forms, including an electromagnetic form, an optical form, etc., or a suitable combination form. The computer storage medium can be any computer-readable medium other than a computer-readable storage medium. The medium can be connected to an instruction execution system, apparatus, or device to implement communication, propagation, or transmission of a program for use. The program code located on the computer storage medium can be propagated through any suitable medium, including radio, a cable, a fiber cable, RF, or similar media, or any combination of the above media.

The computer program code needed for each part of the operation in this specification can be written in any one or more program languages, including object-oriented programming languages such as Java, Scala, Smalltalk, Eiffel, JADE, Emerald, C++, C #, VB.NET, and Python, conventional programming languages such as the C language, Visual Basic, Fortran 2003, Perl, COBOL 2002, PHP, ABAP, and dynamic programming languages such as Python, Ruby, and Groovy, or other programming languages. The program code can run entirely on a user computer, or run as an independent software package on a user computer, or partially run on a user computer and partially run on a remote computer, or run entirely on a remote computer or server. In the latter case, the remote computer can be connected to a user computer through any form of network, such as a local area network (LAN) or a wide area network (WAN), or connected to an external computer (for example, through the Internet), or in a cloud computing environment, or used as a service, such as software as a service (SaaS).

In addition, unless expressly stated in the claims, the order of the processing elements and sequences, the use of numerals and letters, or the use of other names described in this specification is not intended to limit the order of the procedures and methods described in this specification. Although some embodiments of this specification considered useful currently are discussed by using various examples in the above disclosure, it should be understood that such details are merely used for illustration. The additional claims are not limited to the disclosed embodiments, and instead, the claims are intended to cover all amendments and equivalent combinations that conform to the essence and scope of the embodiments of this specification. For example, although the system components described above can be implemented by a hardware device, the system components can also be implemented by a software solution, for example, installing the described system on an existing server or mobile device.

Similarly, it is worthwhile to note that, to simplify the description disclosed in this specification and help understand one or more embodiments of this specification, in the above descriptions of the embodiments of this specification, a plurality of features are sometimes incorporated into one embodiment, drawing, or descriptions of the embodiment and the drawing. However, this disclosure method does not mean that features needed by the object of this specification are more than the features mentioned in the claims. In fact, the features of the embodiments are less than all features of individual embodiments disclosed above.

Numerals describing quantities of components and attributes are used in some implementations. It should be understood that such numerals used for the description of the embodiments are modified in some examples by modifiers such as "about", "approximately", or "generally". Unless otherwise stated, "about", "approximately", or "generally" indicates that a change of ±20% is allowed for the numeral. Correspondingly, in some embodiments, numeric parameters used in this specification and the claims are approximations, and the approximations can change based on features needed by some embodiments. In some embodiments, the numeric parameters should take into account the specified significant digits and use a general digit retention method. Although in some embodiments of this specification, numeric domains and parameters used to determine the ranges of the embodiments are approximations, in specific implementations, such values are set as precisely as possible in a feasible range.

Each patent, patent application, and patent application publication and other materials such as articles, books, specifications, publications, or documents are incorporated into this specification here by reference in their entireties, except for the historical application documents inconsistent or conflicting with the content of this specification, and the documents (attached to this specification currently or later) that limit the widest scope of the claims of this specification. It is worthwhile to note that, if the description, definition, and/or use of the terms in the attachments of this specification are inconsistent or conflict with the content of this specification, the description, definition, or use of the terms of this specification shall prevail.

Finally, it should be understood that the embodiments described in this specification are merely used to describe the principles of the embodiments of this specification. Other variations may also fall within the scope of this specification. Therefore, by way of example instead of limitation, alternative configurations of the embodiments of this specification can be considered to be consistent with the teachings of this specification. Correspondingly, the embodiments of this specification are not limited to the embodiments expressly described in this specification.

What is claimed is:

1. A computer-implemented method for privacy preserving model training, comprising:
    performing a plurality of iterative update rounds on a model held by a data party of a plurality of data parties participating in training, wherein an iterative update round comprises:
        performing, based on a training sample held by the data party of a plurality of data parties, iterative training on the model to train both a shared portion of the model and a dedicated portion of the model to obtain model data, wherein the model data comprises first shared data corresponding to the shared portion of the model and local data corresponding to the dedicated portion of the model, and wherein the iterative training comprises adding a perturbation to the first shared data corresponding to the shared portion of the model to perform privacy preservation on at least the first shared data in the model data;
        transmitting the first shared data to a server, which determines, based on first shared data of the plurality of data parties, second shared data;
        obtaining the second shared data returned by the server;
        training the shared portion of the model based on the second shared data to obtain an updated model; and
        performing a next iterative update round based on the updated model or using the updated model as a final model.

2. The computer-implemented method of claim 1, wherein the iterative training comprises:
    inputting feature data of the training sample held by the data party to the model to determine a prediction result;
    determining a loss function value based on label data corresponding to the training sample and the prediction result;
    determining gradient data based on the loss function value, wherein the gradient data comprises shared gradient data corresponding to the shared portion of the model and dedicated gradient data corresponding to the dedicated portion of the model;
    adding a perturbation to the shared gradient data;
    determining the model data based on the dedicated gradient data and the shared gradient data obtained added with the perturbation; or
    updating the dedicated portion of the model based on the dedicated gradient data, updating the shared portion of the model based on the shared gradient data obtained added with the perturbation, and performing next iterative training based on an updated model.

3. The computer-implemented method of claim 2, wherein, adding a perturbation to the shared gradient data, comprises:
    obtaining a predetermined clipping threshold;
    limit a value of an element in the shared gradient data to prevent an absolute value of any element in the shared gradient data from exceeding the predetermined clipping threshold;
    generating noise data; and
    superimposing the noise data on the shared gradient data to obtain the shared gradient data added with the perturbation.

4. The computer-implemented method of claim 3, wherein:
    the noise data comprises Gaussian noise, a variance of the Gaussian noise is determined based on the predetermined clipping threshold, a privacy budget, and a relaxation term; and
    and an average value of the Gaussian noise is 0.

5. The computer-implemented method of claim 2, wherein, determining the model data based on the dedicated gradient data and the shared gradient data obtained added with the perturbation, comprises:
    using the dedicated gradient data and the shared gradient data obtained added with the perturbation as the model data; or
    updating a model parameter in the shared portion of the model based on the shared gradient data obtained added with the perturbation, updating a model parameter in the dedicated portion of the model based on the dedicated gradient data, and using an updated model parameter in the shared portion and an updated model parameter in the dedicated portion as the model data.

6. The computer-implemented method of claim 1, wherein the second shared data is a weighted sum value or a weighted average value of the first shared data of the plurality of data parties.

7. The computer-implemented method of claim 1, wherein models respectively held by the plurality of data parties have a same model structure.

8. The computer-implemented method of claim 1, wherein the model data comprises:
a model parameter or gradient data obtained after one or more times of iterative training.

9. The computer-implemented method of claim 8, wherein, when the model data comprises the gradient data obtained after one or more times of iterative training:
updating the dedicated portion of the model based on the local data in the model data.

10. A non-transitory, computer-readable medium storing one or more instructions executable by a computer system to perform one or more operations for privacy preserving model training, comprising:
performing a plurality of iterative update rounds on a model held by a data party of a plurality of data parties participating in training, wherein an iterative update round comprises:
performing, based on a training sample held by the data party of a plurality of data parties, iterative training on the model to train both a shared portion of the model and a dedicated portion of the model to obtain model data, wherein the model data comprises first shared data corresponding to the shared portion of the model and local data corresponding to the dedicated portion of the model, and wherein the iterative training comprises adding a perturbation to the first shared data corresponding to the shared portion of the model to perform privacy preservation on at least the first shared data in the model data;
transmitting the first shared data to a server, which determines, based on first shared data of the plurality of data parties, second shared data;
obtaining the second shared data returned by the server;
training the shared portion of the model based on the second shared data to obtain an updated model; and
performing a next iterative update round based on the updated model or using the updated model as a final model.

11. The non-transitory, computer-readable medium of claim 10, wherein the iterative training comprises:
inputting feature data of the training sample held by the data party to the model to determine a prediction result;
determining a loss function value based on label data corresponding to the training sample and the prediction result;
determining gradient data based on the loss function value, wherein the gradient data comprises shared gradient data corresponding to the shared portion of the model and dedicated gradient data corresponding to the dedicated portion of the model;
adding a perturbation to the shared gradient data;
determining the model data based on the dedicated gradient data and the shared gradient data obtained added with the perturbation; or
updating the dedicated portion of the model based on the dedicated gradient data, updating the shared portion of the model based on the shared gradient data obtained added with the perturbation, and performing next iterative training based on an updated model.

12. The non-transitory, computer-readable medium of claim 11, wherein, adding a perturbation to the shared gradient data, comprises:
obtaining a predetermined clipping threshold;
limit a value of an element in the shared gradient data to prevent an absolute value of any element in the shared gradient data from exceeding the predetermined clipping threshold;
generating noise data; and
superimposing the noise data on the shared gradient data to obtain the shared gradient data added with the perturbation.

13. The non-transitory, computer-readable medium of claim 12, wherein:
the noise data comprises Gaussian noise, a variance of the Gaussian noise is determined based on the predetermined clipping threshold, a privacy budget, and a relaxation term; and
and an average value of the Gaussian noise is 0.

14. The non-transitory, computer-readable medium of claim 11, wherein, determining the model data based on the dedicated gradient data and the shared gradient data obtained added with the perturbation, comprises:
using the dedicated gradient data and the shared gradient data obtained added with the perturbation as the model data; or
updating a model parameter in the shared portion of the model based on the shared gradient data obtained added with the perturbation, updating a model parameter in the dedicated portion of the model based on the dedicated gradient data, and using an updated model parameter in the shared portion and an updated model parameter in the dedicated portion as the model data.

15. The non-transitory, computer-readable medium of claim 10, wherein the second shared data is a weighted sum value or a weighted average value of the first shared data of the plurality of data parties.

16. The non-transitory, computer-readable medium of claim 10, wherein models respectively held by the plurality of data parties have a same model structure.

17. The non-transitory, computer-readable medium of claim 10, wherein the model data comprises:
a model parameter or gradient data obtained after one or more times of iterative training.

18. The non-transitory, computer-readable medium of claim 17, wherein, when the model data comprises the gradient data obtained after one or more times of iterative training:
updating the dedicated portion of the model based on the local data in the model data.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for privacy preserving model training, comprising:
performing a plurality of iterative update rounds on a model held by a data party of a plurality of data parties participating in training, wherein an iterative update round comprises:
performing, based on a training sample held by the data party of a plurality of data parties, iterative training on the model to train both a shared portion of the model and a dedicated portion of the model to obtain model data, wherein the model data comprises first shared data corresponding to the shared portion of the model and local data corresponding to the dedicated portion of the model, and wherein the iterative training comprises adding a perturbation to the first shared data corresponding to the shared portion of the model to perform privacy preservation on at least the first shared data in the model data;

transmitting the first shared data to a server, which determines, based on first shared data of the plurality of data parties, second shared data;

obtaining the second shared data returned by the server;

training the shared portion of the model based on the second shared data to obtain an updated model; and performing a next iterative update round based on the updated model or using the updated model as a final model.

20. The computer-implemented system of claim 19, wherein the iterative training comprises:

inputting feature data of the training sample held by the data party to the model to determine a prediction result;

determining a loss function value based on label data corresponding to the training sample and the prediction result;

determining gradient data based on the loss function value, wherein the gradient data comprises shared gradient data corresponding to the shared portion of the model and dedicated gradient data corresponding to the dedicated portion of the model;

adding a perturbation to the shared gradient data;

determining the model data based on the dedicated gradient data and the shared gradient data obtained added with the perturbation; or updating the dedicated portion of the model based on the dedicated gradient data, updating the shared portion of the model based on the shared gradient data obtained added with the perturbation, and performing next iterative training based on an updated model.

* * * * *